United States Patent [19]

Doblinger

[11] 4,221,598

[45] Sep. 9, 1980

[54] PROCESS FOR THE PRODUCTION OF STEAM-HARDENED GAS CONCRETE

[75] Inventor: Heinz Doblinger, Emmering, Fed. Rep. of Germany

[73] Assignee: Hebel Gasbetonwerk GmbH, Emmering-Furstenfeldruck, Fed. Rep. of Germany

[21] Appl. No.: 884,362

[22] Filed: Mar. 7, 1978

[30] Foreign Application Priority Data

Mar. 7, 1977 [DE] Fed. Rep. of Germany ....... 2709858

[51] Int. Cl.$^3$ .............................................. C04B 7/02
[52] U.S. Cl. ...................................... 106/87; 106/120
[58] Field of Search ................................. 106/87, 120

[56] References Cited

U.S. PATENT DOCUMENTS 2,803,556  8/1957  Carlsson et al. ..................... 106/120
2,880,101  3/1959  Ulfstedt ............................... 106/120

*Primary Examiner*—James Poer
*Attorney, Agent, or Firm*—Darby & Darby

[57] ABSTRACT

Disclosed herein is a process for the production of steam hardened gas concrete which comprises producing an unprocessed mixture containing a binder consisting of lime and cement, at least one silicate containing aggregate and at least one calcium sulfate, and processing the mixture to form steam hardened gas concrete. At least a portion of the silicate containing aggregate and the calcium sulfate are mutually ground together during the process. A predetermined quantity of calcium sulfate is employed so that the total sulfate content (expressed as $SO_3$) of the finished product is between about 2 and about 5% by weight based on the ignition loss-free dry weight.

22 Claims, No Drawings

PROCESS FOR THE PRODUCTION OF STEAM-HARDENED GAS CONCRETE

This invention relates to a process for the production of steam-hardened gas concrete, in which an unprocessed mixture is produced consisting of lime and cement as the binder, with the share of lime exceeding the share of cement, at least one silicate-containing aggregate (additive) and at least one calcium sulfate and said unprocessed mixture is then processed to form steam-hardened gas concrete.

German laying-open print DOS 2,439,244 already reveals a process for the production of construction material mixtures for dense silicate concrete using lime, cement, anhydrite, quartz sand and water, in which the quartz sand is ground together with the anhydrite and all components are then mixed and blended during a mixing process. The content in these mixtures of sulfate contained in the cement and in the anhydrite, expressed as $SO_3$, amounts to a maximum of 1.35% by weight. The known process is aimed at the production of constant concrete qualities from nonstandardized binders.

Austrian patent specification No. 177,713 reveals a process for the production of steam-hardened porous artificial stone from finely ground mixtures of burned, slaked or slightly hydraulic lime with a high CaO content, material rich in silicic acid such as sand, water and a gas-evolving metal powder. In order to regulate both the slaking of the lime and the evolution of gas as well as the hardening of the composition, a sulfate such as calcium sulfate and hydratable or water-soluble silicates such as Portland cement or waterglass are added to the afore-said mixture in an amount of 3–4% by weight of the dry components, the amount of sulfate (calculated as $CaSO_4$) being equal to at least 10% of the amount of the finely ground silicate-containing material. If larger amounts of sulfate are necessary, as easily soluble sulfate, e.g. alkali sulfate, should be chosen preferably according to the teaching of the afore-quoted patent specification.

The example in the afore-mentioned patent specification also recites that the compressive strength of lightweight concrete produced from such mixtures can be enhanced if 3.5% ground cement clinker, 2 g gypsum and 1–4 g of potassium sulfate or 2–8 g of sodium sulfate per liter are added to a mixture consisting of 20% by weight of burned lime with approx. 94% of CaO and 80% by weight of ground sand with 80% $SiO_2$. This corresponds to an $SO_3$ content of approx. 0.14–0.28%.

On the basis of an $SO_3$ content in the cement clinker amounting 0.1%, the result is a total $SO_3$ content in the mixture of approx. 0.24–0.38% $SO_3$. An addition of merely 2 g of gypsum per liter and omission of the alkali sulfate does not result in a compressive strength increase. The drawback of this process is that the addition of alkali sulfate causes blistering on the lightweight concrete end products. Another drawback is that the alkali sulfate required to enhance the compressive strength are expensive.

On the other hand, German patent specification No. 1,646,580 relates to a process for the production of steam-hardened gas concrete in which a cement-rich binder of fine white lime and Portland cement is used. It is known from this publication that an addition of calcium sulfate in gas concretes consisting predominantly of fine white lime as the binder results in a reduction of strength.

The object of the invention is therefore to provide a process for the production of steam-hardened gas concrete which is suitable for implementation on a large industrial scale and which results in end products with excellent compressive strengths while avoiding the drawbacks of the prior art.

This object is accomplished in a process of the type cited at the outset in that calcium sulfate is added in such amounts that the total sulfate content of the end product, expressed as $SO_3$, amounts from 2 to 5% by weight based on the ignition loss-free dry weight, and at least a portion of at least the components silicate-containing aggregate and the calcium sulfate are ground together.

In accordance with the inventive process, gas concrete end products are surprising obtained which possess excellent compressive strengths. Another advantage is that the share of binder can be decreased due to the high compressive strengths attained, thereby resulting in considerable savings of expense. The manufacturing expenses are reduced even further due to the fact that an addition of alkali sulfate is unnecessary in the inventive process, since—as was mentioned above—alkali sulfates are very expensive compared with other raw materials.

In accordance with a preferred embodiment, calcium sulfate is added in the inventive process in such amounts that the sulfate content of the end product, expressed as $SO_3$, amounts to approximately 3% by weight. In accordance with the invention, naturally occuring anhydrite ($CaSO_4$) is preferably used as the calcium sulfate. Furthermore, gypsum ($CaSO_4.2H_2O$) or its semi-hydrate ($CaSO_4.\frac{1}{2}H_2O$) can be used as well as the calcium sulfate.

In accordance with yet another preferred embodiment of the inventive process, cement, preferably Portland cement, is used in such amounts that the share of cement in the binder amounts to at least approx. 20% by weight. This measure allows the already high compressive strength of the end products to be increased even further.

Fine white lime is preferably used as the lime in the inventive process. Lime with a considerable content of slaked lime, however, may also be used.

In accordance with the invention, quartz sand, silicate-containing air-borne ash, oil shale slag and blast furnace slag, among other things, can be used as silicate-containing aggregates.

In the inventive process, at least a portion of the components silicate-containing aggregate and calcium sulfate is mutually ground together. Grinding these components together contributes to the surprising increase in compressive strength obtained in accordance with the invention. The total amounts of silicate-containing aggregate and calcium sulfate are preferably ground together during the inventive process. According to another embodiment of the inventive process, a portion of all components, i.e. lime, cement, silicate-containing aggregate and calcium sulfate, can also be ground together. Particularly satisfactory results are obtained if the total amounts of all components are ground together. If only portions of the components are ground together, the resultant mixture after grinding is then mixed with the remaining amount of the components. The common grinding in accordance with the invention is carried out as a dry grinding operation for practical purposes.

According to yet another embodiment of the inventive process, the silicate-containing aggregate can be dried by means of fine white lime prior to the grinding of all components if this should prove necessary. This method is especially economical, since part of the lime present in gas concretes consisting predominantly of fine white lime as the binder frequently occurs in the form of lime hydrate. Drying is carried out specifically such that one portion of the fine white lime is mixed with the moist silicate-containing aggregate, e.g. sand with a moisture content from 5–8%, thereby withdrawing the moisture from the latter. In so doing, it is unnecessary to add the stoichiometric amount of fine white lime to the sand, since the drying of the sand is even achieved at a sub-stoichiometric fine white lime amount owing to the heat generated as the lime combines with the water. The resultant dry mixture is then mutually ground together with the remaining components. In this way it is possible to eliminate drying the moist silicate-containing aggregate which may otherwise prove to be necessary and entail additional costs.

The inventive process can be expediently carried out as described hereinbelow: the individual components are withdrawn from silos containing the components employed in accordance with the invention, are apportioned by conveyor type weighers into a ball mill and are mutually ground there until 10–25% residue remains on a sieve with a clear mesh of 90 microns. The duration of grinding is dependent on the state of the starting material and normally amounts to about 30 minutes. The resultant unprocessed mortar mixture can be stored in silos or processed directly to form steam-hardened gas concrete. In this case, the unprocessed mortar mixture is mixed, as is commonly the case, with water and a gas-developing agent such as finely divided aluminum powder, and is filled into molds. After the gas-evolving process and maturing, the resultant large blocks are cut to format (stones, flagstones) which are then steam-hardened.

The examples serve to illustrate and explain the invention.

In examples 1 to 4, quartz-containing sand, fine white lime, cement and anhydrite are used in the ratios listed in the table below.

In example 1 (comparison example), the binder (fine white lime and cement) and the sand were not ground together but were merely mixed together. Previously ground sand was used for this purpose. No anhydrite was added to the mixture.

In inventive example 2, the binder, the sand and the anhydrite were ground together.

In example 3 (comparison example), the binder, the anhydrite and the same were not ground together, but rather the components were merely mixed together.

In example 4 (comparison example), the binder was mutually ground together with the sand, but no anhydrite was added.

The resultant four mixtures were then processed to form steam-hardened gas concrete specimens in an identical manner as explained below:

Each of the four mixtures was admixed with 37.5% water and mixed intimately for 3 minutes. Immediately thereafter aluminum powder was added and, after a further 50 seconds of mixing, the mortar mixture was filled into a mold. The temperature of the water to be admixed was selected such that the mortar mixture had a temperature between 40 and 42° C. as it was filled into the mold. During the maturation time of 3 hours, the temperature in the cast blocks rose to approx. 80° C. After completion of the maturation time, the mold was removed and the green gas concrete blocks were moved into the autoclave. After an evacuation time of 30 minutes, steam treatment was carried out in accordance with the following hardening cycle:

heating-up time: 1 hour, 30 min.
compression time: 6 hours hardening pressure (12 bars)
blow-off time: 2 hours.

The resultant gas concrete blocks were sawed perpendicular to the direction of gas evolution to form cylinders 10 cm in height and 10 cm in diameter. These were then examined for compressive strength and specific gravity in compliance with German industrial standards DIN 4223 and DIN 4165 with an examining moisture content of 3–10% by volume.

The results have been compiled in the table.

| Example Components Grinding | 1 (Comparison) Binder and sand (without anhydrite) not together | 2 (Inventive) Binder, sand and anhydrite together | 3 (Comparison) Binder and anhydrite not together | 4 (Comparison) Binder and sand (without anhydrite) together |
|---|---|---|---|---|
| Quartz-containing sand, % | 72 | 66,0 | 66,0 | 72,0 |
| Fine white lime, % | 18,0 | 18,0 | 18,0 | 18,0 |
| Cement, % | 10,0 | 10,0 | 10,0 | 10,0 |
| Anhydrite, % | — | 6,0 | 6,0 | — |
| Compressive strength, kg/cm$^2$* | 31,0 | 48,3 | 32,2 | 34,4 |
| Specific weight kg/dm$^3$ | 0,55 | 0,55 | 0,55 | 0,55 |
| Green standing strength, kg/cm$^2$ | 0,8 | 2,6 | 0,9 | 1,8 |

*determined according to German industrial standard DIN 4223

A comparison of the compressive strengths obtained in examples 1 and 3 shows that the sole addition of anhydrite (calcium sulfate) causes practically no improvement in the compressive strength of the gas concrete. The result of a comparison of the compressive strengths obtained in examples 1 and 4 is that the common grinding of the components without any addition of anhydrite only causes a slight increase in strength. Surprisingly, however, an increase in compressive strength amounting to almost 50% is achieved by the combination of the common grinding in conjunction with the addition of calcium sulfate (see examples 1 and 2). Hence, it is surprisingly possible to utilize the inventive process to achieve a considerable increase in compressive strength of the end product even in the case of mortar mixtures consisting predominantly of lime (fine white lime) as the binder. Furthermore, the increase in the green standing strength (see the values in the preceding table) achieved in accordance with the invention is also advantageous and was not predictable. This increase in the green standing strength permits a greater number of batches per unit time, thereby increasing the economy of the manufacture of gas concrete.

In addition to the use, known per se, of substantially lesser amounts of calcium sulfate than are used in accordance with the invention in mixtures whose binder consists of a lesser amount of cement and a greater amount of lime (see Austrian patent specification No. 177,713), the common grinding of a plurality of components of mortar mixtures was already known as well (see Roebert, "Silikatbeton", VEB Verlag fuer Bauwesen, Berlin, 1st edition, page 132), where the common grinding of sand with lime and cement is described. The advantages of common grinding according to this literature source are the intensive homogenization and the mechano-chemical activation of the resultant mixture. These effects are also assumed to be responsible for the somewhat higher compressive strength and the somewhat higher green standing strength in example 4 as compared to example 1. Surprisingly enough, however, a marked synergistic increase in the compressive strength and in the green standing strength is achieved in the inventive amounts in combination with the inventive common grinding of all components by the addition of calcium sulfate which, however, negatively affected the strength according to German patent specification No. 1,646,580 in gas concrete consisting predominantly of fine white lime as the binder.

What is claimed is:

1. A process for the production of an unprocessed mixture for processing into steam-hardened gas concrete comprising:
    mutually grinding together at least one silicate containing aggregate and at least one calcium sulphate constituent to form a ground-up mixture;
    employing a sufficient amount of said calcium sulphate constituent in said mixture such that the total sulphate content of the end product, expressed as $SO_3$, is from about 2 to about 5% by dry weight with no annealing loss; and
    combining said ground-up mixture with a binder consisting of lime and cement to form an unprocessed mixture, the amount of lime exceeding the amount of cement.

2. A process according to claim 1, wherein calcium sulfate is added in such amounts that the sulfate content of the end product, expressed as $SO_3$, amounts to approximately 3% by weight.

3. A process according to claim 1, wherein said cement is added in such amounts that the quantity of cement in the binder amounts to at least about 20% by weight of said binder.

4. A process according to claim 1, wherein the lime comprises fine white lime.

5. A process according to claim 4, wherein one portion of the fine white lime is used to dry the silicate-containing aggregate and the dry mixture and the remaining components are ground together.

6. A process according to claim 1, wherein the total amount of silicate-containing aggregate and calcium sulfate are ground together.

7. A process according to claim 1, wherein at least one portion of each of the lime, cement, silicate-containing aggregate and calcium sulfate components of said unprocessed mixture are mutually ground together.

8. A process according to claim 7, wherein the total amount of lime, cement, silicate-containing aggregate and calcium sulfate are ground together.

9. A process according to claim 1, wherein said grinding operation is carried out simultaneously with said combining operation.

10. A process according to claim 1, wherein said grinding operation is carried out prior to said combining operation.

11. In the process of producing steam-hardened gas concrete from an unprocessed mixture consisting of lime, cement, calcium sulphate and silicate containing aggregate, the improvement which comprises:
    mutually grinding together at least a portion of the silicate containing aggregate and at least a portion of the calcium sulphate components of said mixture, and
    preparing said mixture with a sufficient amount of said calcium sulphate constituent such that the total content of the end product, expressed as $SO_3$, amounts to from about 2 to about 5% by weight based on the dry weight of said end product with no annealing loss, and the amount of lime in said mixture exceeds the amount of cement.

12. In a process for the production of steam-hardened gas concrete the steps of:
    preparing an unprocessed mixture comprising a binder consisting of lime and cement, the amount of lime exceeding the amount of cement, said mixture also containing at least one silicate containing aggregate and at least one calcium sulphate constituent;
    employing a sufficient amount of said calcium sulphate constituent in said mixture such that the total sulphate content of the end product, expressed as $SO_3$, is from about 2 to about 5% by dry weight with no annealing loss;
    mutually grinding together at least a portion of said unprocessed mixture.

13. A process according to either of claims 1 or 2 wherein the calcium sulphate comprises gypsum.

14. A process according to either of claims 1 or 2 wherein the calcium sulphate comprises gypsum semihydrate.

15. A process according to claim 1 wherein the lime comprises slaked lime.

16. A process according to claim 1 wherein said silicate containing aggregate comprises blast furnace slag.

17. A process according to claim 1 wherein said silicate containing aggregate comprises sand.

18. The process according to claim 2 further including a processing step which comprises:
    admixing said unprocessed mixture with water, and adding a gas developing agent to said admixture.

19. A process according to claim 18 wherein said gas developing agent comprises aluminum powder.

20. A process according to claim 19 which comprises maturing said admixture in a mold.

21. A process according to claim 20 which comprises treating said admixture with steam under heat and pressure.

22. A process according to claim 1 or claim 2, wherein the calcium sulphate comprises anhydrite.

* * * * *